United States Patent [19]

Ecke, Jr.

[11] Patent Number: 4,724,276

[45] Date of Patent: Feb. 9, 1988

[54] PROCESS FOR ALTERING POINSETTIA GROWTH CHARACTERISTICS

[76] Inventor: Paul Ecke, Jr., 441 Saxony Rd., Encinitas, Calif. 92024

[21] Appl. No.: 897,768

[22] Filed: Aug. 7, 1986

[51] Int. Cl.$^4$ ............................................... A01G 1/00
[52] U.S. Cl. .......................................... 800/1; 47/6; 47/58
[58] Field of Search ...................... 47/58, DIG. 3, 6–7

Primary Examiner—Robert E. Bagwill
Attorney, Agent, or Firm—Charles W. Rummler

[57] ABSTRACT

A technique is described by which plant growth characters are altered in poinsettias. In particular, the branching characteristics of restricted branching cultivars are altered by grafting their scions onto understock plants which are free branching. Stem diameters, internode lengths, number of cuttings, leaf morphology and dates of flowering are altered as the new scion grows after the graft has become established and consequently new cultivars are created by growing cuttings from the new scion. These changes, as a result of these graft unions, are permanent over many generations of the new cultivar and these changes are uniform among the new plants.

3 Claims, 11 Drawing Figures

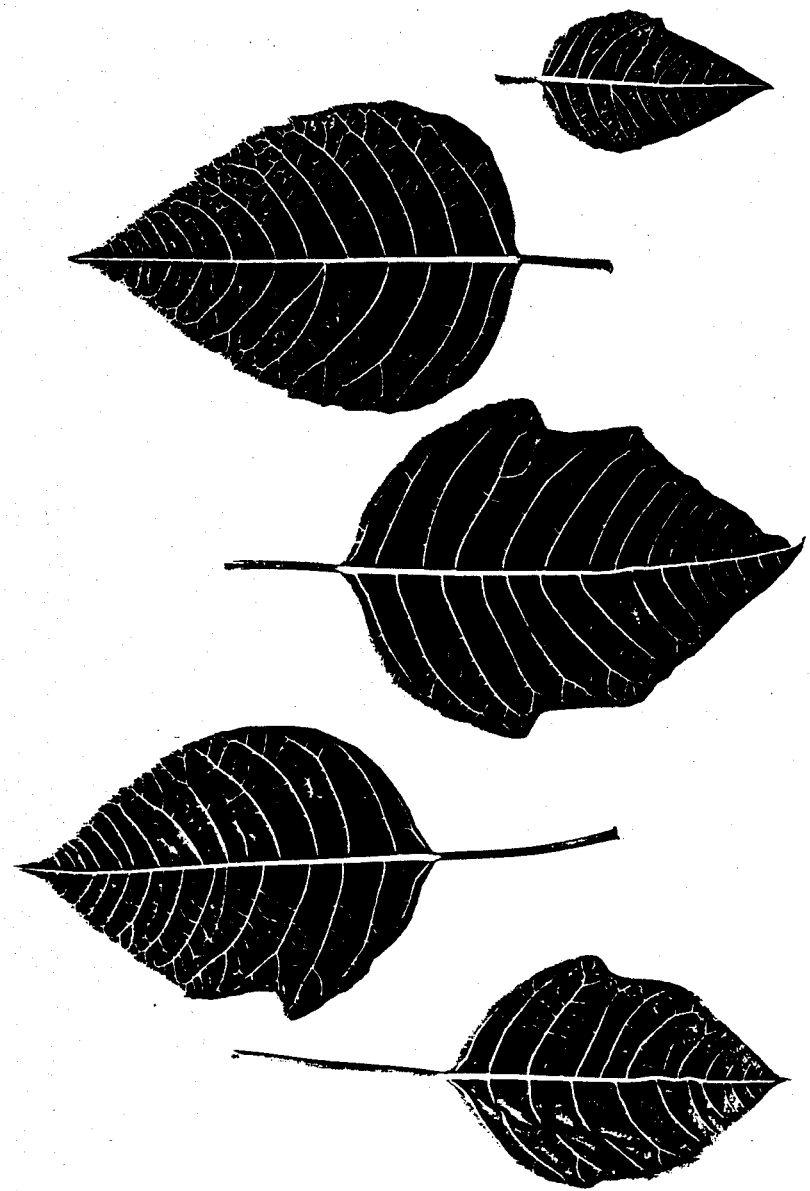

PROCESS FOR ALTERING POINSETTIA GROWTH CHARACTERISTICS

BACKGROUND OF THE INVENTION

The poinsettia (*Euphorbia pulcherrima* Willd. ex Ketsch) has become the most important Christmas flowering potted plat in the United States and Europe. The original introduction into the United States was in 1825 by the U.S. ambassador in Mexico, where it is native species.

The Ecke firm (Encinitas, Calif.) has been intimately associated with the commercial production of poinsettia stock plants since 1919. Until 1965, field grown dormant woody plants were shipped through the United States and the world. Since 1965, softwood vegetative cuttings (unrooted, callused or rooted) have been used to develop stock plants. Cuttings from Ecke's poinsettias are shipped to other greenhouse firms who produce vegetative cuttings for their own use or for sale to their grower customers. These vegetative cuttings are rooted, grown for various time spans and eventually "flower". In the northern hemisphere, flowering occurs under naturally shortening day lengths in the early fall, or under artificially shortened days at any time of the year. The true flowe is composed of numerous small cuplike structures, botanically known as cyathia. The showy bracts, which may be of red to cream-white in color, surround these cyathia and together form the inflorencense. These colorful bracts are botanically modified leaves.

Presently the Ecke firm has over 30 patented cultivars. These cultivars can be divided into those which are free branching or those which are restricted in their branching habit. The main difference is the propensity of shoots to elongate at the lower nodes. Restricted branching cultivars exhibit strong apical dominance as only a few (1 to 3) axillary shoots grow after the terminal growing point has been removed (pinched). Free branching cultivars form many axillary shoots depending on the number of nodes that remain after pinching. Consequently, restricted branching cultivars produce fewer vegetative cuttings; and when such plants are placed under short days, restricted branching cultivars produce fewer inflorescences.

SUMMARY OF THE INVENTION

My invention relates to the production of new poinsettia varieties, and more particularly to the production of poinsettia plants, both vegetative and reproductive, by controlling their plant form, e.g. branching characteristic, leaf morphology, stem diameter and date of flowering, by the grafting of restricted branching cultivars serving as scions onto free branching cultivars as rootstock. The growing of cuttings from the grafter scions results in the production of new plants which are different from the original rootstock and the scions and are indeed new cultivars.

DESCRIPTION OF THE DRAWINGS

A specific illustration of my new process and typical results therefrom are illustrated by the accompanying drawings, in which:

FIG. 11 shows the under side surface of the leaves shown in FIG. 10.

A TYPICAL PRACTICE OF THE INVENTION

Figure 3:
FIG. 3 is a free branching cutting from the grafted scion.
Figure 1:
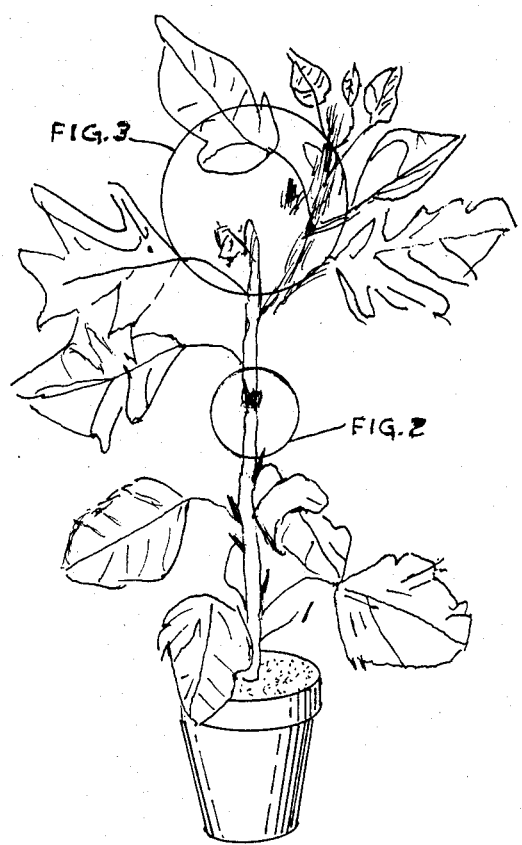
FIG. 1 is a sketch showing a grafted poinsettia plant comprising a restricted branching scion grafted onto free branching rootstock.
Figure 2:
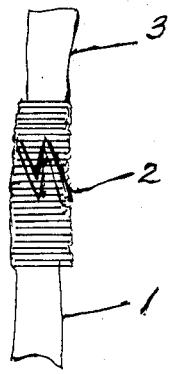
FIG. 2 is an enlarged view illustrating the graft indicated in FIG. 1.

It is the object of this invention to modify and alter plant characteristics by grafting, FIGS. 1 and 2. The whole process is done under a long day photoperiod in order to prevent "flowering". The new growth of the scion has a vegetative shoot or stem which is, over time, altered. When this new growth is removed as a cutting and rooted, a new and truly distinct cultivar is formed, as shown in FIG. 3. The change is stable and uniform and appears to be firmly fixed, as shown by the new plants resulting from numerous generations of cuttings for cuttings.

Figure 5:
FIG. 5 is a photographic print showing the scion plant from which its stem will be grafted onto the rootstock plant shown in FIG. 4.
Figure 4:
FIG. 4 is a photographic print showing a free branching plant used to provide the rootstock grafting stem.
Figure 7:
FIG. 7 is a photographic print showing a flowering plant grown from a cutting of the scion shown in FIG. 6.
Figure 6:
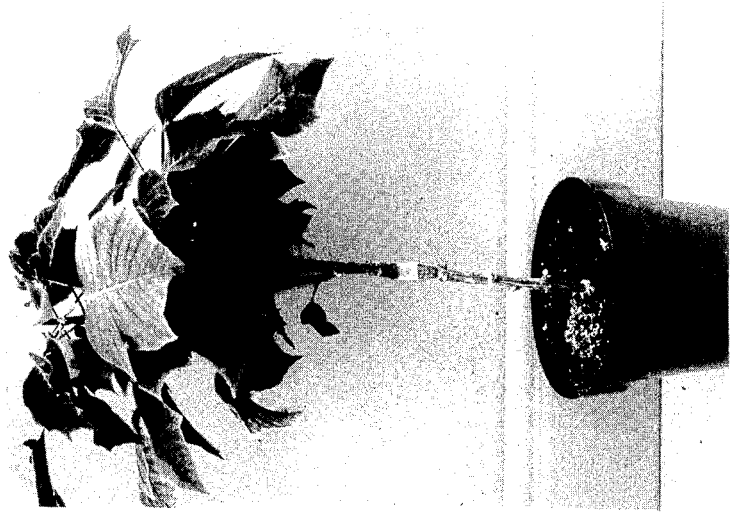
FIG. 6 is a photographic print showing the scion plant of FIG. 5 grafted onto the rootstock of FIG. 4.

Free branching is one of the most obvious plant characteristics which results from this grafting process. In this process, an established free branching cultivar is used as the understock, FIGS. 1 and 4, and a restricted branching cultivar is used as the scion, FIG. 5, and is grafted onto the stock, FIGS. 1 and 6. Grafting can be accomplished by any of the several well known established and commonly known grafting techniques or methods. After the graft union has become established, or healed by cell division, the free branching characteristic is transferred from the stock into the scion and this newly grafted plant is allowed to grow in a normal manner under long day conditions. Cuttings taken from the scion portion of the grafted plant are free branching, whereas the scion posessed restricted branching characteristics before grafting.

Figure 8:
FIG. 8 shows the upper leaf surface of the scion plant foliage.
Figure 9:
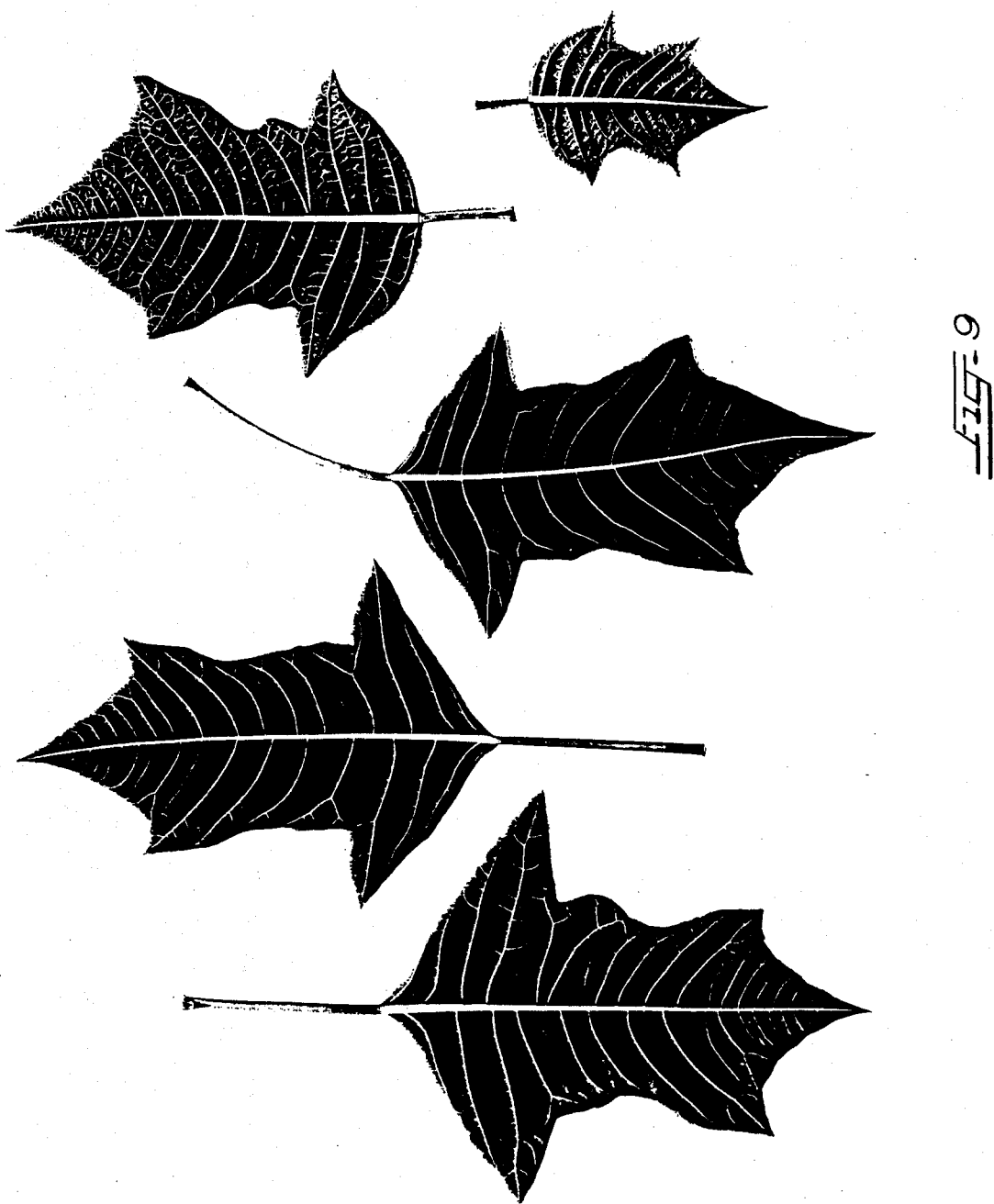
FIG. 9 shows the under surface of the leaf shown in FIG. 8.
Figure 10:
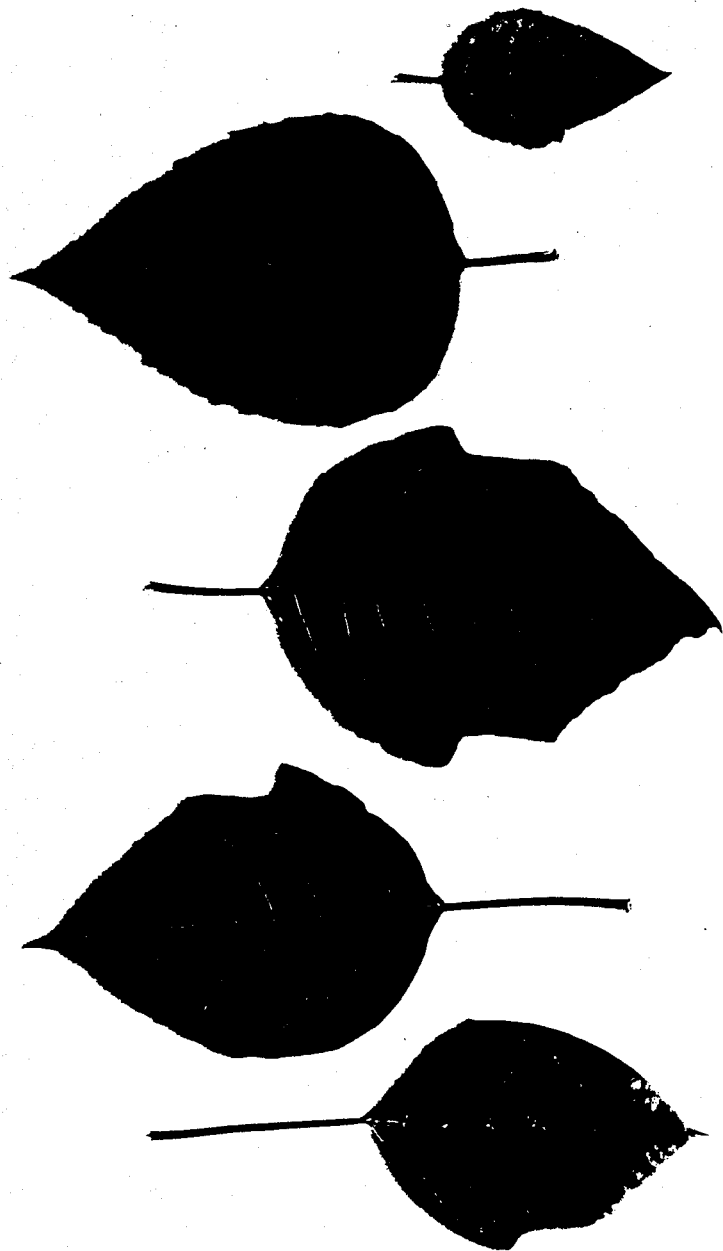
FIG. 10 shows the upper surface of a leaf of a cultivar resulting from the grafting process.

Other plant characteristics might also be modified or altered by the grafting process. Leaf shape can be modified, including the amount of lobing, as shown by FIGS. 8 and 10. The flowering response may be changed so that the new cultivar flowers earlier or later than the original scion cultivar and leaf color may be modified so that the green leaves and colored bracts are lighter or darker. The capacity of the plant to form abscission layers at the base of leaves and bracts under stress may also be altered.

Although but one example of this invention has been shown and described, it will be understood that modification of the practice described may be made without departing from the spirit of this invention as defined by the following claims.

I claim:

1. A method to permanently alter plant growth characteristics in poinsettia which comprises the steps of providing a plant having free branching characteristics to be used as rootstock; providing a scion plant which has certain desirable characteristics and to which the free branching plant characteristics are to be imparted; and making a graft union between the cellular tissue of the rootstock plant and scion plant whereby the characteristics of any adventitious vegetative shoot arising from the scion or stock are altered and include the free branching characteristic.

2. A vegetative shoot resulting rom the graft union of claim 1.

3. A plant resulting from clonal propagation of the vegetative shoot of claim 2.

* * * * *